(12) United States Patent
Dobson et al.

(10) Patent No.: US 6,761,228 B2
(45) Date of Patent: Jul. 13, 2004

(54) LOCKING WING LIFT MECHANISM FOR FARM IMPLEMENTS

(75) Inventors: David A. Dobson, York (CA); Cory W. Ochitwa, Yorkton (CA)

(73) Assignee: Morris Industries Ltd., Yorkton (CA)

( * ) Notice: Subject to any disclaimer, the term of this patent is extended or adjusted under 35 U.S.C. 154(b) by 0 days.

(21) Appl. No.: 10/268,875

(22) Filed: Oct. 9, 2002

(65) Prior Publication Data

US 2004/0069510 A1 Apr. 15, 2004

(51) Int. Cl.[7] .............................................. A01B 49/00
(52) U.S. Cl. ........................ 172/311; 172/456; 111/54; 111/57
(58) Field of Search ............................... 172/311, 452, 172/456, 457, 458, 634.5, 776; 111/54, 57, 62

(56) References Cited

U.S. PATENT DOCUMENTS

| | | | |
|---|---|---|---|
| 3,123,153 A | | 3/1964 | Morkoski et al. |
| 3,650,333 A | | 3/1972 | Fueslein |
| 3,692,121 A | | 9/1972 | Kenney |
| 3,693,724 A | | 9/1972 | Fuesiein et al. |
| 3,713,495 A | | 1/1973 | Redford |
| 3,797,580 A | * | 3/1974 | Roth ........................... 172/311 |
| 3,814,191 A | | 6/1974 | Tilbury |
| 4,030,551 A | * | 6/1977 | Boetto et al. ............... 172/126 |
| 4,061,195 A | | 12/1977 | Pryor |
| 4,074,766 A | * | 2/1978 | Orthman ..................... 172/311 |
| 4,116,282 A | * | 9/1978 | Hansen ........................ 172/311 |
| 4,151,886 A | | 5/1979 | Boetto et al. |
| 4,232,747 A | | 11/1980 | Pfenninger et al. |
| 4,316,511 A | | 2/1982 | Anderson |
| 4,328,869 A | * | 5/1982 | Perelli ......................... 172/311 |
| 4,336,846 A | * | 6/1982 | Boetto ......................... 172/776 |
| 4,342,367 A | * | 8/1982 | Gates .......................... 172/776 |
| 4,415,043 A | * | 11/1983 | Hadler et al. ............... 172/776 |
| 4,418,763 A | * | 12/1983 | Boetto ......................... 172/776 |
| 4,453,601 A | | 6/1984 | Orthman et al. |
| 4,529,040 A | | 7/1985 | Grollimund |
| 4,561,505 A | | 12/1985 | Williamson |
| 4,878,545 A | * | 11/1989 | Dyken ......................... 172/776 |
| 5,540,290 A | | 7/1996 | Peterson et al. |
| 5,921,325 A | * | 7/1999 | Meek et al. ................. 172/311 |
| 6,382,327 B1 | * | 5/2002 | Mosdal ....................... 172/311 |

OTHER PUBLICATIONS

John Deere Brochure—Cultivators and Hoes—"Win your War on Weeds the Low–Cost Way"—(Cover page and pp. 6, 7, 8, 9, 14, 15).
Wil–Rich Row Crop Cultivators Brochure—(Cover page, 2 additional pages and Back Page).
Kinze Brochure—(Cover page, Model 2100 3 Point Mounted page, and p. 19.
John Deere—Max Emerge 2 Planters (Cover page, p. 13 and 22).

* cited by examiner

*Primary Examiner*—Victor Batson
(74) *Attorney, Agent, or Firm*—Hovey Williams LLP

(57) ABSTRACT

In a preferred embodiment of the invention an extension section of a frame is held down in its locked position by the same mechanism that folds and unfolds the frame extension. When the frame extension is in its locked down position, it bears against a limit stop that precludes further movement in an unfolding direction. An operating link that is pushed and pulled by a hydraulic cylinder to manipulate the frame extension is controlled in such a way by a guide member that the line of action of the link is directed transversely toward a guide surface of the guide when the frame extension is in its unfolded position. Thus, only a small amount of force is required from the hydraulic cylinder at that time to maintain the link in its locked position, since most of the load from the link is born by the guide surface at this time. In a preferred embodiment, the line of action of the link is approximately perpendicular to the guide surface.

21 Claims, 7 Drawing Sheets

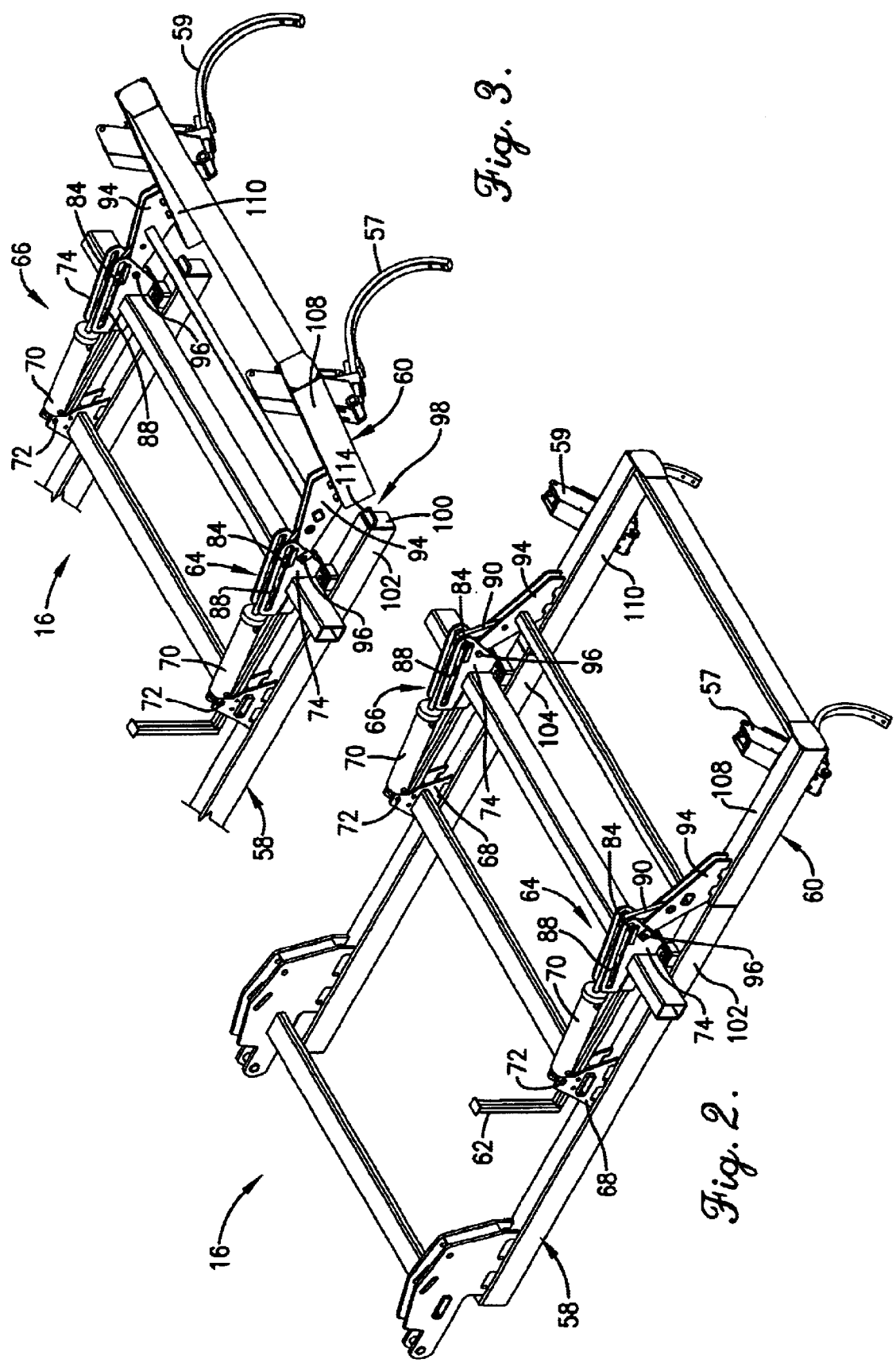

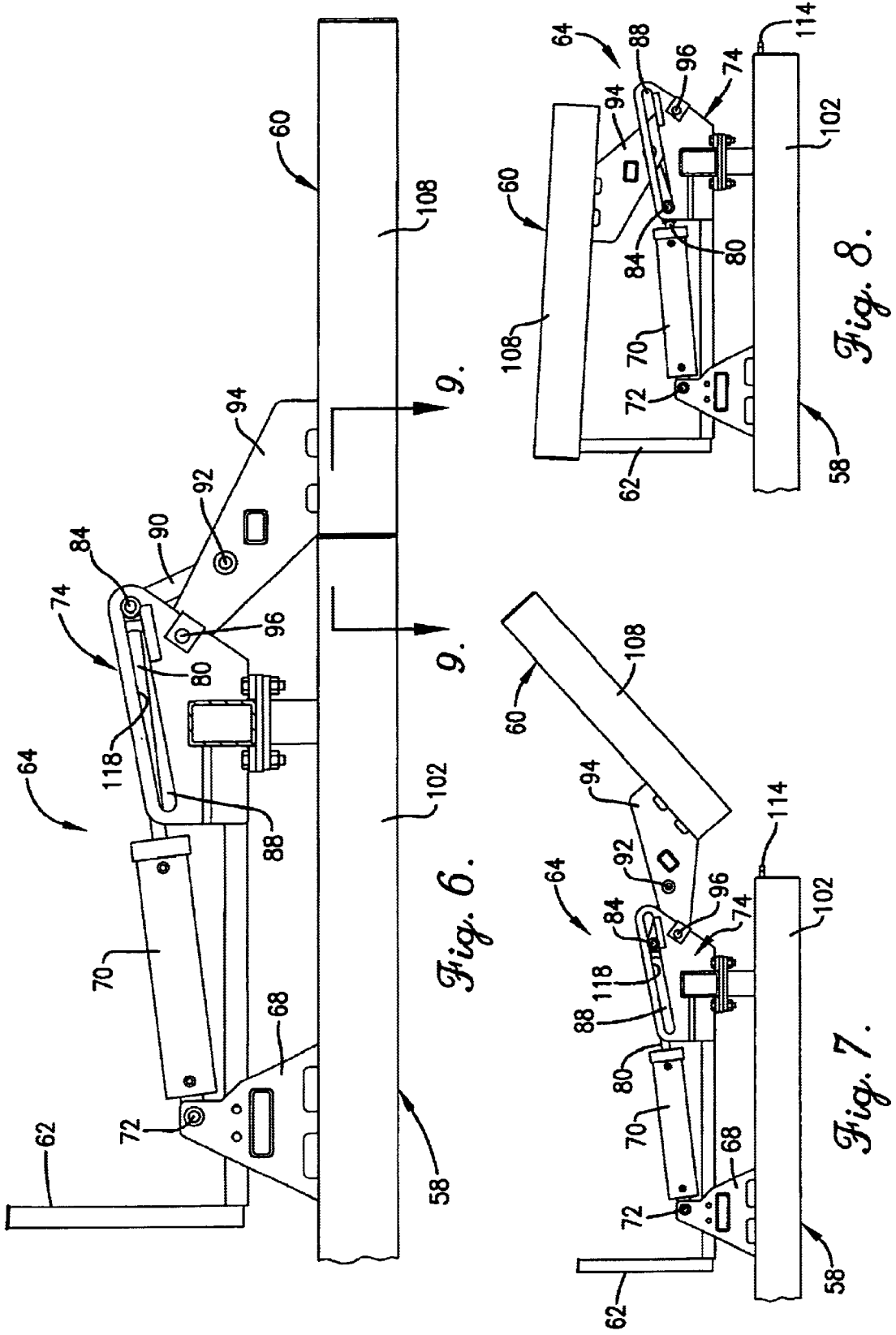

LOCKING WING LIFT MECHANISM FOR FARM IMPLEMENTS

TECHNICAL FIELD

The present invention relates to agricultural implements and, more particularly, to folding frame arrangements for such implements.

BACKGROUND AND SUMMARY

Agricultural implements such as seeders and tillage tools, for example, often have relatively wide frames that must be narrowed for road transport or other purposes. In many instances such narrowing of the frame is effected by folding one or more frame sections vertically or horizontally relative to one another.

It is known in the art to have a pair of relatively foldable frame sections, such as a tool bar or an open box frame, wherein the two sections can be locked rigidly in their unfolded relationship so that one of the sections is effectively an extension of the other. However, in such prior arrangements, a lock or latch that is separate and apart from the hydraulic cylinder mechanism that accomplishes the folding and unfolding action is required in order to lock the sections in their unfolded relationship. In some instances, for example, the operator must leave the cab of the towing vehicle and manually lock and unlock the mechanism. In some other arrangements, extra remotely actuatable hydraulic cylinders and the like are available to accomplish this task.

In the present invention two relatively foldable frame sections can be locked in their unfolded relationship using the same mechanism that accomplishes folding and unfolding of the sections. Thus, there is no need for separate and additional mechanism or devices to accomplish the locking function. Moreover, locking and unlocking can be carried out from the tractor seat as an inherent part of the folding and unfolding operation.

In the present invention one frame section is swingable relative to another during folding and unfolding operations. When the swingable section is down in its unfolded position, it abuts a limit stop on the other frame section. This can be at any selected angular relationship between the frame sections, but in a preferred embodiment the two sections are in end-to-end alignment with one another in the unfolded position. An operating link connected between the swingable section and a hydraulic cylinder on the other section transfers power from the cylinder to the swingable section to carry out folding and unfolding, and a guide on the stationary section controls the link in such a manner that as the cylinder extends and retracts, the swingable section is moved between its and folded and unfolded positions. The geometrical relationship between the various components of the mechanism is such that when the swingable section is in its unfolded position against the limit stop, the operating link is in a locking position with its line of action directed toward a guide surface of the guide, preferably in the neighborhood of being at right angles with the guide surface, so that movement of the swingable section out of its unfolded position is resisted by the guide surface. The hydraulic cylinder that normally pushes and pulls on the link to swing the swingable section is used at this time to retain the operating link in this locking position, only a small amount of force being required by the cylinder to carry out its retaining function since most of the compressive loading from the control link is directed against the guide surface at this time.

Preferably, the guide surface comprises one edge of an elongated guide slot in which guide rollers attached to the proximal end of the operating link are captured for moving back and forth along the slot during folding and unfolding of the swingable section. Thus, a simple, yet effective means if provided for locking the swingable frame section in its unfolded position without the need for additional mechanisms or assemblies above and beyond that which is used to carry out folding and unfolding of the section.

BRIEF DESCRIPTION OF THE DRAWINGS

FIG. 2 is a somewhat enlarged top, left isometric view of the left wing of the implement of FIG. 1 illustrating the outer extension section of the wing locked down in its unfolded, extension position;

FIG. 3 is a fragmentary isometric view similar to FIG. 2, but illustrating the extension section partially raised up out of its unfolded position;

FIG. 6 is a fragmentary front elevational view of the wing of FIG. 2 with the extension section in its unfolded position corresponding to that of FIG. 2;

FIG. 7 is a fragmentary front elevational view of the wing corresponding to the partially folded condition of FIG. 3;

FIG. 8 is a fragmentary front elevational view of the wing corresponding to the condition of things in FIG. 4;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References to "right" and "left" in this specification are made from the vantage point of one standing at the rear of the machine looking forwardly.

Figure 1:
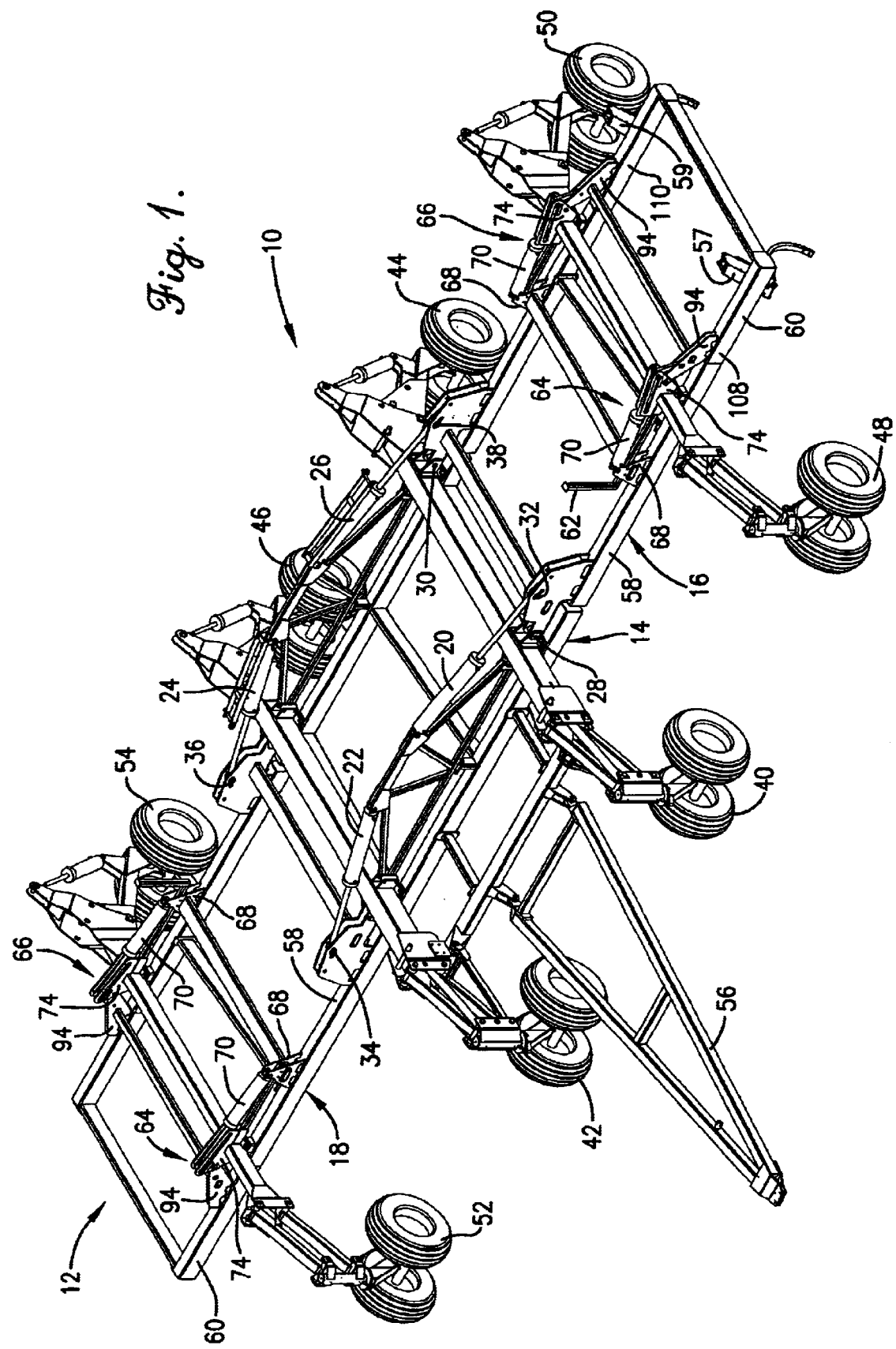
FIG. 1 is a top, front, left isometric view of an exemplary agricultural implement embodying the principles of the present invention.

The implement 10 illustrated in FIG. 1 is but one example of many types of implements with which the present invention can be used. The particular implement selected for purposes of illustration is a tillage machine, but could just as easily comprise a seeder or other type of implement. Moreover, although the illustrated machine is illustrated as a 3-section machine having a central section and two hingedly connected wings, any number of frame sections could be utilized, including only a single frame section having a main part and an extension part. Moreover, it will be appreciated that the principles of the present invention do not require that the frame be an open box type frame as illustrated. The implement could just as easily be a tool bar comprising an essentially long, single beam having one or more sections that are folded relative to each other.

In the particular illustrated embodiment, implement 10 includes a transversely extending frame 12 of generally open, box-type construction and having a central frame section 14 and a pair of wings 16 and 18 that are hingedly connected to central frame section 14 at laterally outer ends thereof. In the illustrated embodiment, wings 16 and 18 are adapted to be raised and lowered by wing lift cylinders 20, 22, 24 and 26 between horizontally disposed working positions as illustrated in FIG. 1 and raised, folded positions that are not illustrated in the drawings. Wing 16 is pivotally connected to main section 14 by hinges 28 and 30, while wing 18 is similarly connected to the other end of central section 14. In the illustrated embodiment, wings 16, 18 are free to float up and down to a limited extent during field operations by virtue of the fact that the outer ends of lift cylinders 20–26 are connected to wings 16, 18 via pin and slot connections broadly denoted by the numerals 32, 34, 36 and 38. A multiplicity of ground wheels 40, 42, 44 and 46 support central frame section 14 for over-the-ground travel, while similar ground wheels 48 and 50 support wing 16 and similar ground wheels 52 and 54 support wing 18. A hitch tongue 56 projects forwardly from central section 14 for connecting implement 10 to a towing tractor (not shown). Ground engaging tools, as exemplified by the tools 57 and 59 on wing 16, are supported by frame 12 at a number of locations on central section 14 and wings 16, 18.

Figure 4:
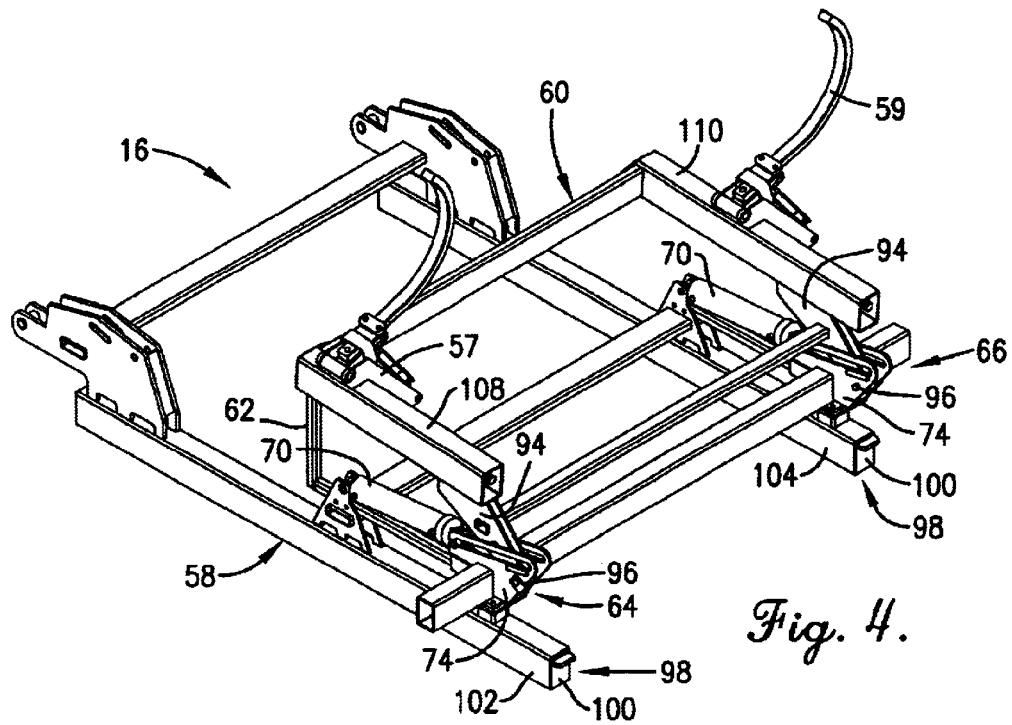
FIG. 4 is a isometric view similar to FIG. 2 showing the extension section completely folded up into overlapping relationship with the main section of the wing.

Each of the wings 16, 18 includes a main section 58 and an extension section 60. Extension section 60 is hingedly connected to main section 58 so that extension section 60 may be swung between an unfolded or extension position as illustrated in FIGS. 1, 2 and 6, and a 180° folded position as illustrated in FIGS. 4 and 8. An upstanding rest 62 on main section 58 supports extension section 60 when the latter is in its folded position.

Figure 12:
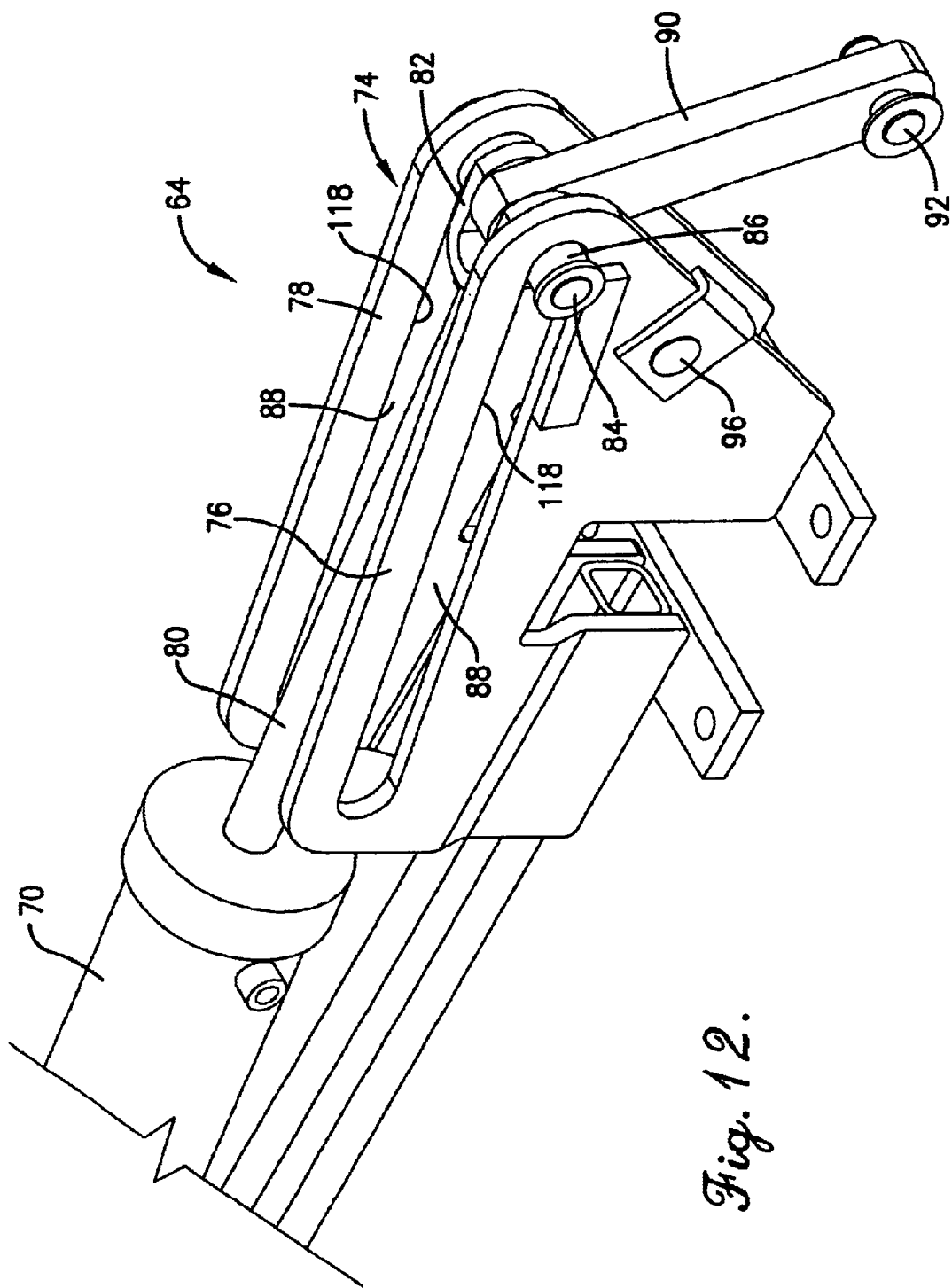
FIG. 12 is an enlarged, fragmentary front isometric view of the folding mechanism illustrating details of construction.

Each wing 16 and 18 includes a pair of mechanisms 64 and 66 for swinging the corresponding extension section 60 between its folded and extended positions and for locking such frame section in its extended position. Each mechanism 64, 66 includes an upstanding mount 68 on the main section 58 that pivotally supports the base end of a fluid pressure operated cylinder 70. A pivot 72 accomplishes this pivotal connection. Each mechanism 64 ,66 further includes a rigid guide 74 on main section 58 spaced outboard from mount 68 and consisting of a pair of upright, fore-and-aft spaced guide plates 76 and 78 (FIG. 12) that are disposed on opposite, fore-and-aft sides of the rod 80 of cylinder 70. Rod 80 has a clevis 82 (FIG. 12) at the outer end thereof that carries a transverse stub shaft 84 which, in turn, carries a pair of rollers 86 at its opposite ends (see FIG. 5 for both rollers 86). Rollers 86 ride within and are captured by a pair of elongated guide slots 88 in the plates 76, 78 so that the outer end of cylinder rod 80 follows a path of travel defined by slots 88 during extension and retraction of cylinder 70. In the illustrated embodiment, the slots 88 are upwardly and outwardly inclined at a slight angle, such as, for example, approximately 10° from the plane of the main section 58.

Each mechanism 64, 66 further includes an operating link 90 that is pivotally connected at its upper end to clevis 82 of cylinder rod 80 by stub shaft 84. At its lower end, each link 90 is connected by a pivot 92 to a pair of upstanding hinge plates 94 on extension section 60. Such hinge plates 94, while being rigidly affixed to extension section 60 at their lower ends, are pivotally connected to guide 74 below slot 88 by a transverse hinge pivot 96. The pivots 96 and hinge plates 94 thus hingedly connect each extension section 60 to the corresponding main section 58.

By virtue of the fact that guide slots 88 control the joint between cylinder 70 and link 90 defined at stub shaft 84 and prevent the joint from collapsing, the cylinders 70 maintain leverage on the extension sections 60 and are enabled to swing such sections between their unfolded and folded positions. The outer ends of each main section 58 serve as limit stops broadly denoted by the numeral 98 for the extension sections 60 to prevent their swinging downwardly past a horizontal position in alignment with main section 58. Each limit stop 98 is in the nature of a rigid, transverse end wall 100 extending across the otherwise open end of a tubular beam 102 or 104 of the main section 58. A contact member 106 secured to a corresponding tubular beam 108 or 110 of extension section 60 is disposed for making abutting engagement with end wall 100 when extension 60 is in its unfolded, extended position. In one preferred embodiment, contact member 106 is in the nature of an adjustable bolt assembly including a bolt 112 that can be threaded toward and away from end wall 100 to adjust the exact point at which extension section 60 comes to bear against limit stops 98 to accommodate manufacturing variations and the like.

Figure 5:
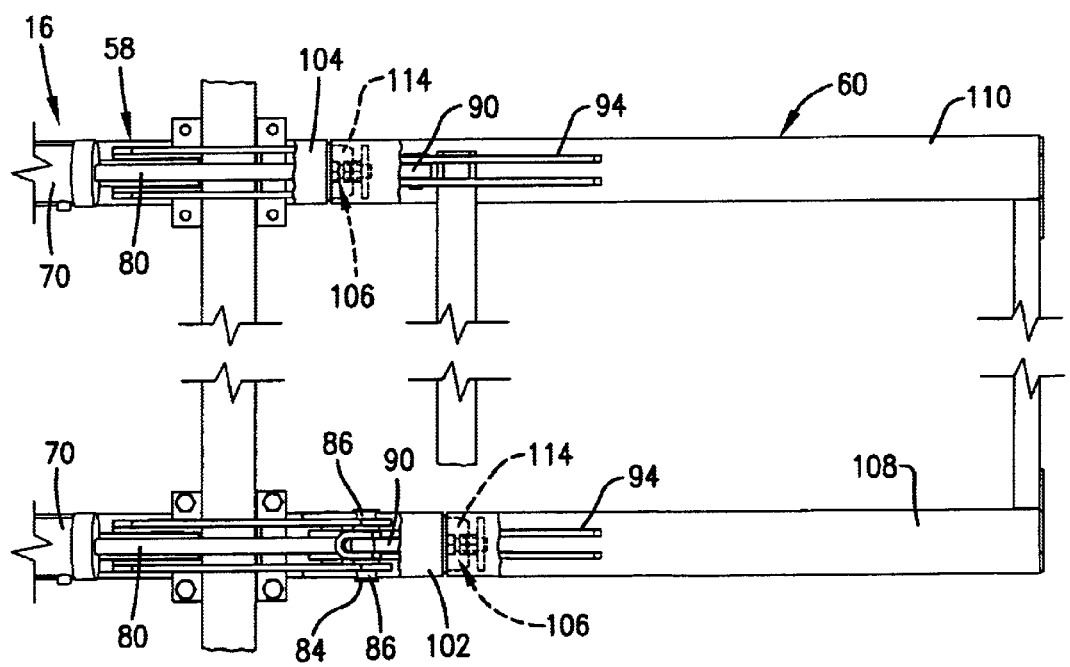
FIG. 5 is a fragmentary top plan view of the wing with the extension section locked down, certain parts being broken away and others shown in phantom to reveal details of construction.
Figure 9:
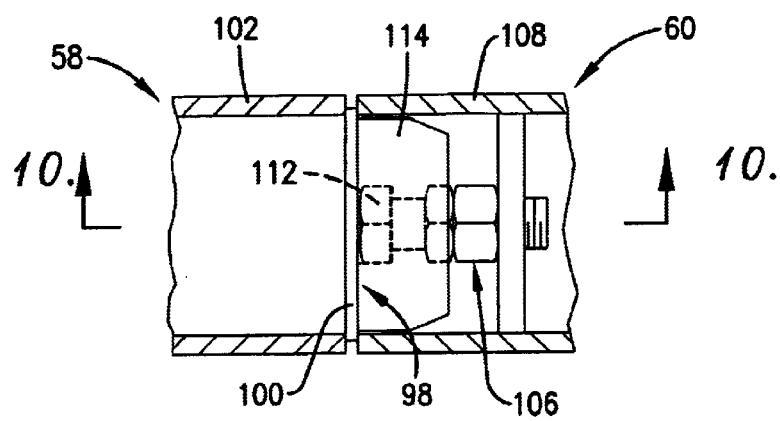
FIG. 9 is an enlarged, fragmentary cross sectional view through opposite end portions of the main section and extension section of the wing illustrating details of construction and taken substantially along line 9—9 of FIG. 6.
Figure 10:
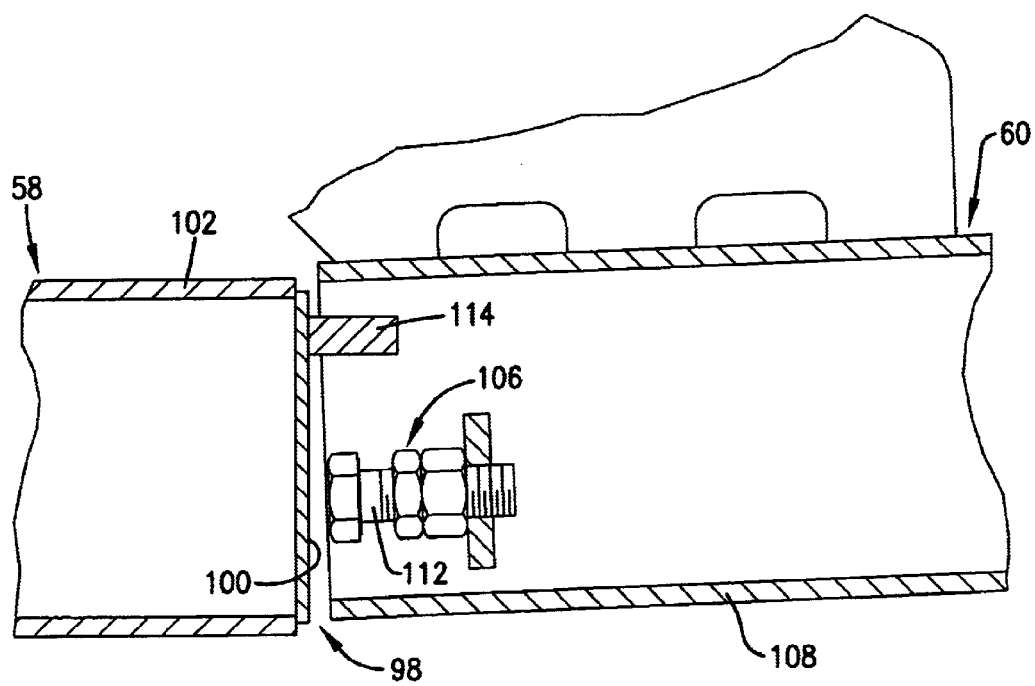
FIG. 10 is a fragmentary cross sectional view through the opposite ends of the main and extension sections taken generally along line 10—10 of FIG. 9 but showing the extension section slightly swung away from the main section.

As illustrated in particular in FIGS. 5, 9 and 10, each beam 108, 110 of main section 58 is provided with a flat, rigid lug 114 that is secured to and projects outwardly from end plate 100 above the level of contact member 106. Each lug 114 extends generally horizontally and is slightly narrower in a fore-and-aft direction than the corresponding beam 108 or 110 of extension section 60. Thus, when extension section 60 is in its extended position, lugs 114 are disposed to fit into and to be generally matingly received by the beams 108, 110 to help resist draft loads exerted on extension section 60 during ground engaging operations of implement 10. This helps take load off hinge pivots 96 and prolongs their useful lives.

OPERATION

Figure 11:
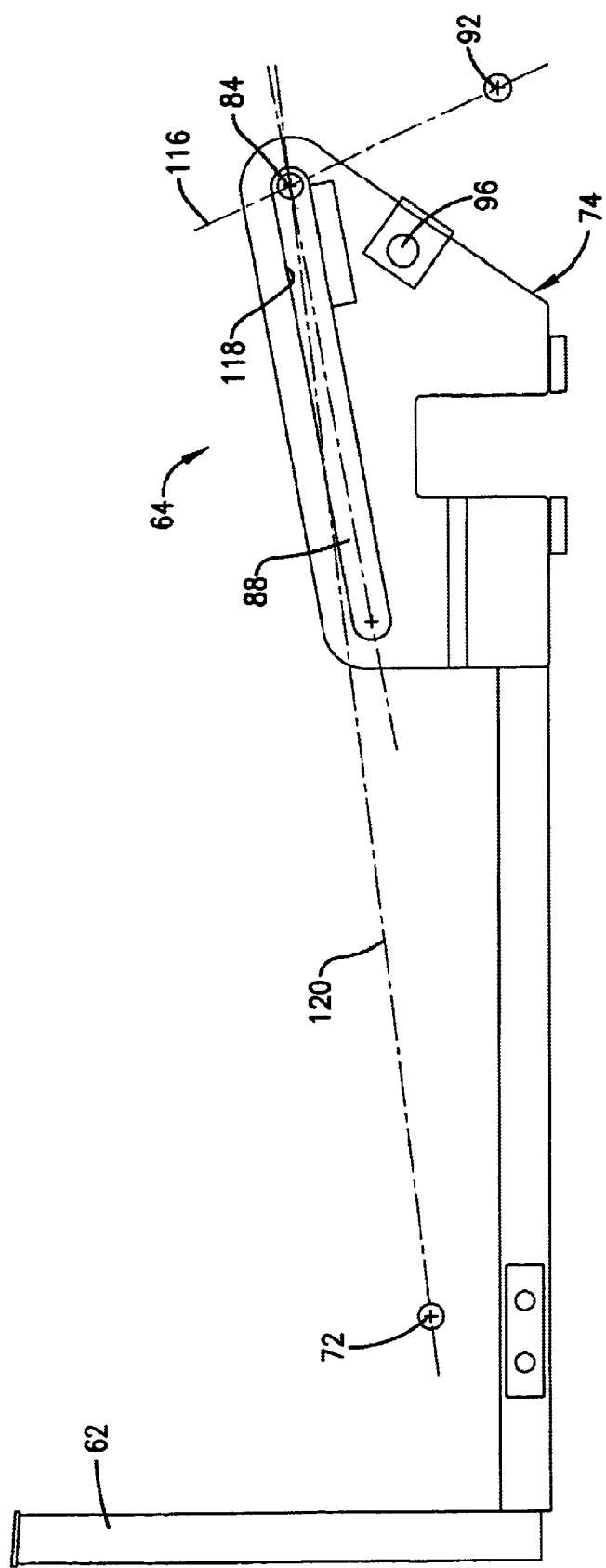
FIG. 11 is a schematic diagram illustrating the geometrical relationships between various components of the folding mechanism when the outer extension section is in its unfolded position and is locked against folding.

When an extension section 60 is in its fully unfolded or extension position against limit stops 98, each link 90 is at the outboard end of slot 88 in a locking position. Thus, the geometrical relationship between slots 88 and link 90 is as illustrated in FIG. 11. As illustrated in that figure, the line of action 116 of link 90 at such time is transverse to the upper edge 118 of slot 88. Since each link 90 is in compression when it pushes extension section 60 down against its limit stops 98, the line of action 116 of link 90 is directed upwardly toward upper guide edge 118 at this time. Thus, with link 90 in this locking position, the upper guide edge 118 bears most of the loading from link 90, with only a relatively small portion thereof being directed through the cylinder rod 80 as represented by line 120 in FIG. 11. In a preferred embodiment, line of action 116 of link 90 is generally at right angles to guide edge 118 so that very little force is required by cylinder 70 to retain link 90 at the outboard end of slot 88, thereby effectively locking extension 60 down against limit stops 98. In the illustrated embodiment the angle between line of action 116 and the top edge 118 of slot 88 when link 90 is in its locking position is 104°.

Link 90 is removed from its locking position by simply retracting cylinder 70. During such retraction, of course, link 90 not only starts to move toward the inboard end of slot 88, but extension section 60 starts to be pulled upwardly by link 90 away from limit stops 98. Cylinder 70 may continue to be actuated to complete the folding operation until extension section 60 is flipped over 180° and comes to rest on rest 16 as illustrated in FIGS. 4 and 8.

It will thus be seen that exactly the same mechanism is used for locking each extension section 60 in its unfolded, extension position as is used to raise and lower the section between folded and unfolded positions. Consequently, there is no need for extra devices of any kind to latch and unlatch the links 90, nor is there any reason for the operator to leave the tractor cab and attend to the locking or unlocking procedure.

The inventor(s) hereby state(s) his/their intent to rely on the doctrine of equivalents to determine and assess the reasonably fair scope of his/their invention as pertains to any apparatus not materially departing from but outside the literal scope of the invention as set out in the following claims.

What is claimed is:

1. In an agricultural implement, the improvement comprising:
    a frame including a pair of hingedly interconnected frame sections,
    one of the sections being positionable in an extended position against a limit stop in which the one section serves as an extension of the other section;
    a fluid pressure operated cylinder on said other section;
    a link operably interconnecting the cylinder and the one section; and
    a guide controlling movement of said link in such a manner during operation of the cylinder that the cylinder is enabled to swing the one section toward and away from said limit stop,
    said guide including a guide surface,
    said link having a locking position when the one section is against said limit stop in which a line of action of the link is directed toward said guide surface such that the guide surface resists movement of said one section away from the limit stop,
    said cylinder being operable to releasably maintain the link in said locking position.

2. In an implement as claimed in claim 1,
    said line of action of the link being generally perpendicular to the guide surface when the link is in said locking position.

3. In an implement as claimed in claim 1,
    said link having a roller that rides against said guide surface during operation.

4. In an implement as claimed in claim 3,
    said guide surface comprising one edge of an elongated slot that receives said roller.

5. In an implement as claimed in claim 1,
    said one frame section being disposed for up and down swinging movement relative to the other section.

6. In an implement as claimed in claim 1,
    said frame sections supporting a plurality of ground-engaging tools.

7. In an implement as claimed in claim 6,
    said other frame section having ground wheels supporting the other frame section for over-the-ground travel,
    said one frame section being devoid of ground wheels.

8. In an implement as claimed in claim 5,
    said other frame section having ground wheels supporting the other frame section for over-the-ground travel,
    said one frame section being devoid of ground wheels.

9. In an implement as claimed in claim 1,
    said other frame section having ground wheels supporting the other frame section for over-the-ground travel,
    said one frame section being devoid of ground wheels.

10. In an implement as claimed in claim 1,
    said other frame section including a transversely extending, tubular beam having a closed outboard end wall,
    said outboard end wall comprising said limit stop.

11. In an implement as claimed in claim 10,
    said one frame section including a transversely extending beam that is disposed in end-to-end alignment with the beam of said other frame section when the one frame section is in said extended position.

12. In an implement as claimed in claim 11,
    said beam of the one frame section having a contact member disposed for abutting engagement with said outboard end wall of the beam of said other frame section when the one frame section is in said extended position,
    said contact member being adjustable relative to said beam of the one frame section toward and away from said outboard end wall of said other frame section.

13. In an implement as claimed in claim 1,
    said one frame section having a tubular transversely extending beam provided with an open inboard end,
    said other frame section having an outwardly projecting lug disposed to enter into said open inboard end of the one frame section when the one frame section is against said limit stop for resisting draft loads on said one frame section.

14. In an agricultural implement, the improvement comprising:
    a frame including a center section and a pair of wings on opposite sides of said center section,
    each of said wings being hingedly connected to the center section for up and down swinging movement between a horizontally disposed working position and a raised transport position,
    each of said wings including a main section and an extension section hingedly connected to the main section;
    wing lift cylinders connected between the center section and the wings for effecting said raising and lowering of the wings;
    ground wheels on the center section and the main sections of the wings for supporting the frame for over-the-ground travel,
    said extension sections being devoid of ground wheels;
    ground-engaging tools supported on the center section, the main section of the wings, and the extension sections of the wings,
    each of said extension sections being positionable in a generally horizontally disposed extended position against a limit stop in which the extension sections serve as extensions of the main sections, and a folded position in which the extension sections are raised out of said extension positions;
    a fluid pressure operated cylinder pivotally connected to the main section of each of said wings for operating the corresponding extension section;

an operating link for each extension section, each link being pivotally connected at one end to the corresponding cylinder and pivotally connected at the opposite end to the corresponding extension section; and a rigid guide on each main section for controlling movement of the links in such a manner during operation of the cylinders that the cylinders are enabled to swing the extension sections toward and away from their respective limit stops, each of said guides having a guide surface, each link having a locking position when its corresponding extension is against its limit stop in which a line of action of the link is directed toward the guide surface of the corresponding guide such that the guide surfaces resist movement of the extension sections away from the limit stops, said cylinders being operable to releasably maintain the links in their locking positions.

15. In an implement as claimed in claim 14, said line of action of the link being generally perpendicular to the guide surface when the link is in said locking position.

16. In an implement as claimed in claim 14, said link having a roller that rides against said guide surface during operation.

17. In an implement as claimed in claim 16, said guide surface comprising one edge of an elongated slot that receives said roller.

18. In an implement as claimed in claim 14, said main section including a transversely extending, tubular beam having a closed outboard end wall, said outboard end wall comprising said limit stop.

19. In an implement as claimed in claim 18, said extension section including a transversely extending beam that is disposed in end-to-end alignment with the beam of said main section when the extension section is in said extended position.

20. In an implement as claimed in claim 19, said beam of the extension section having a contact member disposed for abutting engagement with said outboard end wall of the beam of said main section when the extension section is in said extended position, said contact member being adjustable relative to said beam of the extension section toward and away from said outboard end wall of said main section.

21. In an implement as claimed in claim 14, said extension section having a tubular transversely extending beam provided with an open inboard end, said main frame section having an outwardly projecting lug disposed to enter into said open inboard end of the extension section when the extension section is against said limit stop for resisting draft loads on said extension section.

* * * * *